May 20, 1924.
T. V. BUCKWALTER
BEARING CLOSURE
Filed March 10, 1922
1,494,338
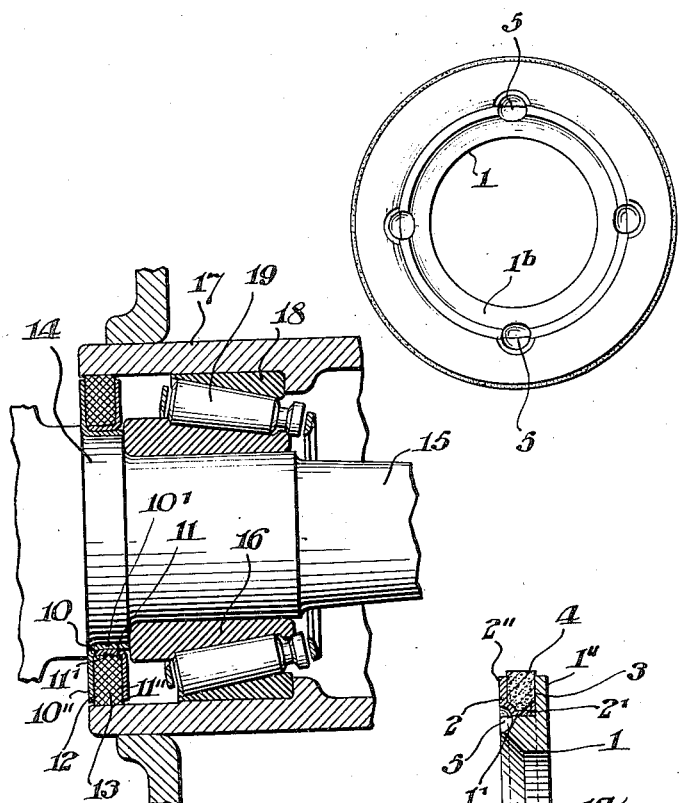
Fig.1.
Fig.3.
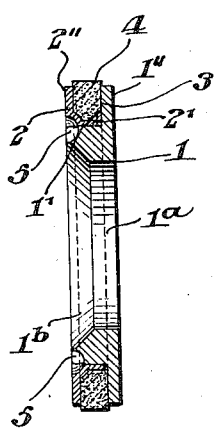
Fig.2.
Inventor:
Tracy V. Buckwalter,
By Butler & Denny
Attorneys.

Patented May 20, 1924.

1,494,338

UNITED STATES PATENT OFFICE.

TRACY V. BUCKWALTER, OF CANTON, OHIO, ASSIGNOR TO THE TIMKEN ROLLER BEARING COMPANY, OF CANTON, OHIO, A CORPORATION OF OHIO.

BEARING CLOSURE.

Application filed March 10, 1922. Serial No. 542,615.

*To all whom it may concern:*

Be it known that I, TRACY V. BUCKWALTER, a citizen of the United States, residing at Canton, in the county of Stark and State of Ohio, have invented an Improved Bearing Closure, of which the following is a specification.

This invention is taken from my application which issued as United States Patent No. 1,364,705, dated January 4, 1921, for improved means for closing bearings, to retain lubricants and exclude foreign matter, and it is designed to provide a simple, inexpensive and efficient construction, that can be easily made and easily applied to wheel axles and hubs.

The present form of my invention, in its preferred construction, is characterized by a composite ring comprising two parts provided with cylindrical surfaces engaged in concentric relation and flanges projecting outwardly therefrom to form a channel in which is disposed a fibrous ring projecting beyond the same.

In the drawings, Fig. 1 is a side view of a ring embodying my invention; Fig. 2 is a sectional view of said ring taken on a diameter thereof, and Fig. 3 is a broken sectional view of a hub and axle provided with anti-friction bearings enclosed by a modified form of the closure illustrated in Figs. 1 and 2.

In the form of the invention illustrated in Figs. 1 and 2, a ring 1, having a relatively heavy body 1' provided with an exterior cylindrical surface and the circular flange 1" projecting outwardly from an edge thereof to form a re-entrant angle therewith, is combined with a ring 2 of angular cross-section having a section 2', whose inner cylindrical surface is engaged on the like surface of the part 1', and a flange 2" extending outwardly therefrom to form a re-entrant angle, the parts 1" and 2" forming a peripheral channel 3. A ring 4 of fibrous material such as felt, is disposed in the channel 3 and extends beyond the flanges 1" and 2". The parts 1 and 2, with their re-entrant angles thus disposed in opposite relation, are fixed together by the frictional engagement in telescoping relation of the parts 1' and 2' and are conveniently secured against possible separation by punching the metal of the parts 1 and 2 at their juncture so as to form distortions or indentations 5.

The part 1, having a substantial amount of metal in the body thereof, is provided with an opening therethrough comprising a cylindrical section 1ª adapted to fit upon a cylindrical section of a spindle and a flaring or conical section 1ᵇ adapted to conform with a similar section at the base of the spindle, this form of closure being adapted to certain specific uses the requirements of which the construction answers.

It will be understood that the sections 1 and 2 can be pressed, stamped or machined.

Fig. 3 illustrates an application of a modified form of the closure in which rings 10 and 11 of L-shaped or angular cross-section are pressed from sheet metal to provide the cylindrical sections 10' and 11' of slightly different widths and diameters as shown, and fixed together in laminated relation with the parts 10" and 11" projecting outwardly from opposite edges thereof to form a channel 12 containing a felt ring 13 projecting beyond the channel.

The composite ring thus formed is placed on the cylindrical base 14 of a spindle 15 having thereon, in abutting relation to the base, a cone 16. The ring 13 engages the inner surface of a hub 17 which has a cup 18 fixed therein, conical rolls 19 being disposed between the cup and cone.

It will be seen that the foregoing closures are adapted for ready application to spindles and hubs having anti-friction bearings between them, the constructions being readily assembled and the bearings being efficiently enclosed.

Having described my invention, I claim:—

1. In a device of the character described, a composite ring having two oppositely projecting parts engaged in laminated relation and flanges extending outwardly therefrom to form a peripheral channel, in combination with a fibrous ring disposed in and projecting beyond said channel.

2. In a device of the character described, a composite ring formed of two dissimilar parts having cross-sections containing re-entrant angles, said parts having concentric surfaces engaged in frictional relation and flanges extending outwardly therefrom to provide a peripheral channel, in combination with a felt ring disposed in and extending beyond said channel.

3. In a device of the character described, the combination with a spindle, a hub and an anti-friction bearing between them, of a closure comprising a composite ring formed of two rings of angular cross-section fixed together in reverse relation, said ring having a laminated part mounted on said spindle, a channel exterior to said laminated part and a felt washer set in and projecting beyond said channel into engagement with the inner surface of said hub.

In testimony whereof I have hereunto set my name this 6th day of March, 1922.

TRACY V. BUCKWALTER.